United States Patent [19]

Bonnebat et al.

[11] Patent Number: 5,030,404

[45] Date of Patent: Jul. 9, 1991

[54] WATER-RESISTANT POLYVINYL ALCOHOL FILM AND ITS APPLICATION TO THE PREPARATION OF GAS-IMPERMEABLE COMPOSITE ARTICLES

[75] Inventors: Claude Bonnebat, Pontault-Combault; Louis Macabrey, Mitry-le-Neuf; Gilbert Roullet, Clamecy, all of France

[73] Assignee: Rhone-Poulenc S.A., Courbevoie, France

[21] Appl. No.: 462,885

[22] Filed: Jan. 3, 1990

Related U.S. Application Data

[60] Division of Ser. No. 114,592, Oct. 30, 1987, abandoned, which is a division of Ser. No. 751,491, Jul. 3, 1985, Pat. No. 4,731,266, which is a continuation-in-part of Ser. No. 716,101, Mar. 26, 1985, abandoned, and a continuation-in-part of Ser. No. 735,721, May 20, 1985, abandoned, said Ser. No. 735,721, is a continuation of Ser. No. 556,556, Nov. 30, 1983, abandoned, said Ser. No. 716,101, is a continuation of Ser. No. 384,760, Jun. 3, 1982, abandoned.

[30] Foreign Application Priority Data

Jun. 3, 1981 [FR] France ................................ 81 11119
Dec. 1, 1982 [FR] France ................................ 82 20119

[51] Int. Cl.$^5$ .............................................. D01F 6/14
[52] U.S. Cl. ...................................... 264/185; 525/56; 525/62
[58] Field of Search ...................... 264/185; 525/56, 62

[56] References Cited

U.S. PATENT DOCUMENTS

| | | | |
|---|---|---|---|
| 3,063,787 | 11/1962 | Rynkiewicz et al. | 525/56 |
| 3,232,916 | 2/1966 | Fogle | 525/56 |
| 3,316,190 | 4/1967 | Suzumura et al. | 524/557 |
| 3,548,031 | 12/1970 | Oyanagi et al. | 524/557 |
| 3,886,112 | 5/1975 | Watson et al. | 524/557 |
| 4,154,912 | 5/1979 | Philipp et al. | 525/56 |
| 4,155,893 | 5/1979 | Fujimoto et al. | 525/56 |
| 4,215,169 | 7/1980 | Wysong | 524/557 |
| 4,272,470 | 6/1981 | Hsu et al. | 525/56 |
| 4,493,807 | 1/1985 | Vyvial et al. | 264/101 |
| 4,542,178 | 9/1985 | Zimmermann et al. | 524/388 |

*Primary Examiner*—Joseph L. Schofer
*Assistant Examiner*—J. M. Reddick
*Attorney, Agent, or Firm*—Sherman and Shalloway

[57] ABSTRACT

Polyvinyl alcohol films are provided which are gelled, non-tacky, bubble-free and resistant to water at ambient temperatures. The polyvinyl alcohol film is obtained by plasticizing (fluxing) and melting granules of pure polyvinyl alcohol containing from 25 to 35% by weight of water at a temperature at least 100° C. above the equilibrium melting point of the granules and less than or equal to 220° C., and extruding the melted granules through a die at a temperature at least 5° C. above the equilibrium melting point of the granules and less than or equal to 98° C., optionally followed by monoaxial stretching or biaxial stretching of the unstretched film obtained. The stretched or unstretched film may be heat-treated to improve its properties. The polyvinyl alcohol film can be used to prepare with thermoplastic films composite films or sheets having a high gas impermeability. The invention also provides composite, biaxially oriented, impermeable barrier layer coated, thermoplastic hollow shaped articles useful as packaging materials, e.g., as packages and bottles for flavored foods and carbonated beverages. The hollow shaped articles are produced by externally barrier covering a thermoplastic tubular blank, parison or preform with a relatively thick barrier layer consisting essentially of water-resistant and highly crystalline polyvinyl alcohol, said barrier layer having been prepared by shaping a melt of homogeneously shear fluxed and molten flakes or pure polyvinyl alcohol having a water content of 25 to 35% by weight thereof, with said shear fluxing and melting of said polyvinyl alcohol flakes being at a temperature above the equilibrium melting point of the polyvinyl alcohol/water admixture essentially constituting said flakes, and said shaping being at a temperature of at least said equilibrium melting point but less than that at which the vapor pressure of the component water would effect the surface expansion and bubbling of the desired barrier layer, and thence biaxially orienting and blow molding into final configuration said barrier covered blank, parison or preform.

13 Claims, 1 Drawing Sheet

WATER-RESISTANT POLYVINYL ALCOHOL FILM AND ITS APPLICATION TO THE PREPARATION OF GAS-IMPERMEABLE COMPOSITE ARTICLES

The present invention relates to a polyvinyl alcohol film and its application to the preparation of composite articles, such as sheets, films, tubes, etc., made from a thermoplastic, especially polyolefin or polyester, and having high impermeability to gases and aromas and to the methods for preparing such films and composite articles More specifically, the invention relates to polyvinyl alcohol films which are characterized by their resistance to water at ambient temperature and by being gelled, non-tacky and bubble-free, as well as to the method for preparing such films and composite articles using such films.

The present invention also relates in one particular aspect to composite, oriented thermoplastic shaped articles utilizing these polyvinyl alcohol films, and especially composite biaxially oriented, thermoplastic hollow shaped articles, such manufacture being carried out via the blow molding of a tubular blank, parison or preform.

The invention more especially relates in this particular aspect to the manufacture of biaxially oriented hollow shaped; articles fabricated from highly crystalline water-resistant layer or substrate of polyvinyl alcohol and a layer or substrate of a polyester, which shaped articles are notably impermeable/impervious to gases and such comestibles as food and beverage flavorings.

The invention also relates to the product shaped articles, per se, having such improved properties.

This invention further relates to tubular blanks, parisons or preforms which are used as starting materials for blowing into said product biaxially oriented hollow shaped articles.

In the present specification and the appended claims, the term "film" is intended to refer to and include, where applicable, both planar, two dimensional, generally flat structures, as well as such structures which may have imparted thereto a three-dimensional configuration, as for example, in a corrugated film, a tubular film, a wavy film, a folded film, etc. Furthermore, in the case of a tubular film, for example, the film may be seamless or have a seam, including a lapped seam, a butt seam, a folded seam, etc. Still further, in its broadest aspect and where the context permits a film is intended to include both free standing, selfsupporting films, as well as laminated films, coated films, film coatings, etc. The term "article" as used herein includes where the context permits, films, sheets, plates, blown or molded hollow bodies, pipes, cylinders, containers, blanks, parisons, preforms and the like.

As utilized herein, by the term "tubular blank" there is intended a section of tube which is open at both ends thereof and which is typically rather long, for example, has a length on the order of from 50 cm to 2 m or more. Similarly, by the term "parison", there is intended a section of tube which is also open at both ends thereof and which has a length typically on the order from 5 cm to 20 cm, or more. Likewise, by the term "preform", there is intended a section of tube, the length of which can be the same or different from that of a parison and which possesses one closed end and an open open end, or neck, which has already been molded into definitive shape desired.

Description of the Prior Art

The gas barrier, especially oxygen barrier, properties of polyvinyl alcohol (PVA) films are well documented and extensive use of PVA films in packaging; etc., has been made in recent years to take advantage of this property. However, PVA films are subject to degradation of their gas barrier properties when exposed to moisture or high humidity. Therefore, various treatments have been proposed to improve the moisture resistance and other physical properties of PVA films.

British Patent Application GB 2,014,476A published Aug. 30, 1979 describes a process for preparing a biaxially drawn polyvinyl alcohol (PVA) film coated with a macromolecular compound other than polyvinyl alcohol on at least one surface of the PVA film. The coated layer of the macromolecular compound provides the function of imparting heat-resistance, heat-sealable function or water-resistance to the PVA film. High tensile films are prepared by fabricating a molten hydrate PVA into a film; drying the film while preventing orientation thereof to form a substantially non-oriented substrate film having a water content of 3 to 20 weight percent; coating an aqueous dispersion of the macromolecular compound on at least one surface of the film; concurrent-biaxially drawing the coated film to a specified area elongation; drying the drawn film while releasing stress; and continuously heat-treating the dried film at about 160° C.

U.S. Pat. No.4,363,840 to Roullet and Legrand provides moisture resistance in PVA films by forming a coating composition of a two-phase structure of a fine dispersion of polyvinyl alcohol occluded in a water-insensitive polymer or matrix that is incompatible with the polyvinyl alcohol.

The "sandwiching" of a vapor barrier polyvinyl alcohol film between water resistant protective layers is described, for example, in U.S. Pat. No.4,254,169 to Schroeder.

British Patent Specification 1,190,018 discloses packaging materials having both low oxygen permeability and high water resistance based on copolymers of vinyl alcohol with olefin monomers and obtained by hydrolysis of olefin/vinyl acetate copolymers. Single-component bioriented film obtained by extrusion of high water content (between 41% and 52% by weight) aqueous polyvinyl alcohol is disclosed in U.S. Pat. No. 3,985,849 to Notomi, et al.

Also in recent years, the field of fabrication of thermoplastic hollow shaped articles has undergone rapid development. The notable capability of polyethylene terephthalar to yield, via the biaxial orientation-blow molding of preforms, bottles which possess excellent mechanical properties (in particular, impact strength and resistance to internal pressure) enabling such bottles to be used advantageously for the packaging of pressurized liquids and carbonated beverages, is especially well known. However, in the case of flavored and/or oxygen-sensitive and/or carbonated liquids, the packaged product often times keeps well for but limited periods of time, as a result of the inadequacy of the impermeability of such hollow shaped articles made of polyethylene terephthalate to gases and to flavorants. This phenomenon is the more significant, the thinner the walls of the hollow shaped article and the higher the ratio of the surface area of the container to the volume of the contents. To reduce the permeability of hollow bodies, it has to date been proposed to coat their surfaces with a barrier material which possesses a lower permeability to gases than the substrate itself.

French Patents No. 2,416,784 and No. 2,416,785 demonstra that polyvinyl alcohol can be an excellent barrier material for biaxially oriented bottles made of polyethylene terephthalate. According to the processes described in these patents, the covering or coating is applied to at least one of the walls of the preform, before the latter is biaxially oriented-blow molded, by coating same with an aqueous solution of polyvinyl alcohol or with an aqueous composition containing polyvinyl alcohol in solution and a polymer latex of low sensitivity to water. The coating is then dried and the preform next biaxially stretched-blow molded.

However, this particular technique is still not totally satisfactory because, when starting with polyvinyl alcohol by itself, there result coverings having inadequate resistance to water, and it is not possible to produce thick coatings on an industrially advantageous level. In fact, the application of the covering by aqueous coating involves the use of coating liquids having a low concentration of polymer. There are two main reasons for this: on the one hand, polyvinyl alcohol is not soluble in water at high concentrations, and on the other hand, coating with a highly viscous medium is difficult to carry out. By coating, therefore, a relatively small amount of material is deposited and the coating which is finally obtained is small in thickness, which is generally between 20 and 50$\mu$ for the preform and between 2 and 5$\mu$ for the final hollow shaped article. Now, in certain cases, in particular when the bottles are destined to contain highly oxygen-sensitive and/or highly carbonated liquids, it is desirable to have a thicker covering in order to enhance the effectiveness of the impermeable barrier material; thus, suitable covering thicknesses are generally between 0.1 and 2 mm for the preform and between 10 and 200 $\mu$ for the final hollow shaped article. Such thicknesses can of course be obtained by aqueous coating, but, in order to achieve this result, it is necessary to make provision, in practice, for the application of several successive layers, with the necessity for suitably drying each intermediate layer, because, in the case of a stack of several coverings, the surface layer will hinder the drying of the lower layers and separation can result if drying is not carried out. Finally, this multiplicity of coating and drying operations removes all industrial value from covering by coating operation in order to deposit thick layers.

Compare also French Patent No. 2,341,433 and U.S. Patent No 4,244,914, U.S. Pat. No. 3,600,487, *Chemical Abstracts*, 89, 44727j (1978) and 91, 194255j (1979)

SUMMARY OF THE INVENTION

In one aspect, the present invention provides polyvinyl alcohol film which is inherently resistant to water at ambient temperatures, i.e. does not require lamination to or mixing with a water resistant substance to protect the polyvinyl alcohol from the loss of its gas barrier properties. This polyvinyl alcohol film is characterized by being gelled, non-tacky, bubble-free and water resistant. In a preferred embodiment of this particular aspect, the polyvinyl alcohol film is heat-treated to render it crystalline and to further improve its barrier properties. In another feature of this aspect of the invention, the polyvinyl alcohol films are monoaxially or biaxially stretched. The polyvinyl alcohol films may be used by themselves in flat, essentially two dimensional form, i.e. as thin films, or as thicker sheets, or the films or sheets may be shaped into a particular configuration or constructed or extruded into tubes, parisons, preforms, blanks, and the like.

Alternatively the polyvinyl alcohol films can be adhered, e.g. coated, deposited or laminated, to a substrate to form a composite article, including composite films, composite tubes, parisons, preforms, blanks or other composite shaped articles.

In another aspect of the invention, a process is provided for preparing the water-resistant, gelled, nontacky, bubble-free polyvinyl alcohol film, such process involving melting an aqueous solution of polyvinyl alcohol and then extruding it through a die, optionally followed by monoaxial or biaxial stretching of the extruded film and by a heat treatment. In accordance with this process 1) the molten material subjected to extrusion is obtained by plasticization (fluxing), by shearing and melting, of granules (or flakes) of polyvinyl alcohol, which granules contain from 25 to 35% by weight of water (preferably about 30% by weight of water), at a temperature above the equilibrium temperature of the polyvinyl alcohol/water mixture forming the granules; and 2) the operation of extrusion through the die is carried out at a temperature at least equal to the equilibrium melting point of the polyvinyl alcohol/water mixture, but below the temperature at which the water vapor pressure is sufficient to cause the formation of bubbles when the material is exposed to the air.

Still another aspect of the present invention is the provision of an improved biaxial orientation/blow molding process, which process features the direct deposition of thick coatings but which does not entail successive coatings in several layers, and which enables production of hollow shaped articles which have improved barrier and water-resistance properties and which retain the desired properties of transparency and gloss. According to this particular aspect of the invention, the process features the manufacture of composite biaxially oriented, thermoplastic hollow shaped articles by first preparing a tubular blank, a parison or a preform, covered, e.g. coated, laminated, etc., with a barrier material based on polyvinyl alcohol, and then biaxially orienting/blow molding said composite tubular blank, parison or preform under the customary conditions of temperature utilized for biaxial orientation, said process being characterized in that the initial preparation of the covered tubular blank, parison or preform involves the following series of steps:

(a) introducing into an extruder, polyvinyl alcohol flakes having a high degree of purity, and a water content in said flakes in the range of from 25 to 35% by weight;

(b) fluxing and melting of the flakes at a temperature above the equilibrium melting point of the polyvinyl alcohol/wate mixture constituting the flakes;

(c) forming a barrier covering of said molten mass of flakes on a substrate of said thermoplastic tubular blank, parison or preform while maintaining the temperature of said molten mass, if necessary, by cooling, at a value which is at least equal to the equilibrium melting point of the polyvinyl alcohol/water mixture, said temperature being below the temperature at which the vapor pressure of the water in the mixture would cause surface expansion and bubbling of the barrier layer; and (d) biaxially orienting and blow molding the barrier covered substrate of step (c) into a final configuration.

Between step (c) and step (d), the following step (c') may be carried out:

(c') taking up the tubular blank, parison or preform coated substrate, and, in the case of the coated tubular blank, converting the tube to a parison or preform, or to a section of said tube (as a precursor of a preform), by cutting to the desired length.

In one embodiment of this particular aspect of the invention, the step (c) may comprise (c-1) extruding the molten mass of flakes from step (b) and externally coating said substrate with said extrudate under the conditions of temperature as specified for step (c).

In another embodiment, the step (c) may comprise the steps (c-2) and (c-4):

(c-2) forming a casing by extrusion-blow molding the molten mass of flakes from step (b) through an annular die under the conditions of temperature as specified for step (c); and (c-4) applying said casing, optionally, after transverse cutting, as a sleeve, over said substrate, thereby forming said barrier covered tubular blank, parison or preform.

In still another embodiment, the step (c) may comprise the steps (c-3) and (c-4):

(c-3) extruding the molten material, under the temperature conditions as specified in step (c) in the form of a tube, and forming a casing from said tube by a calibration operation, in accordance with the technique for manufacture of tube rings, with the aid of a movable shaper with smooth walls, using a slight internal air pressure, and, (c-4) applying said casing, optionally after transverse cutting, as a sleeve, over said substrate thereby forming said barrier covered tubular blank, parison or preform.

It will be appreciated that the tubes, parisons and preforms coated as above indicated can be stored in the open atmosphere without risk, prior to their use in the final biaxial stretching-blow molding step (d)

DETAILED DESCRIPTION OF THE INVENTION

Figure 1:
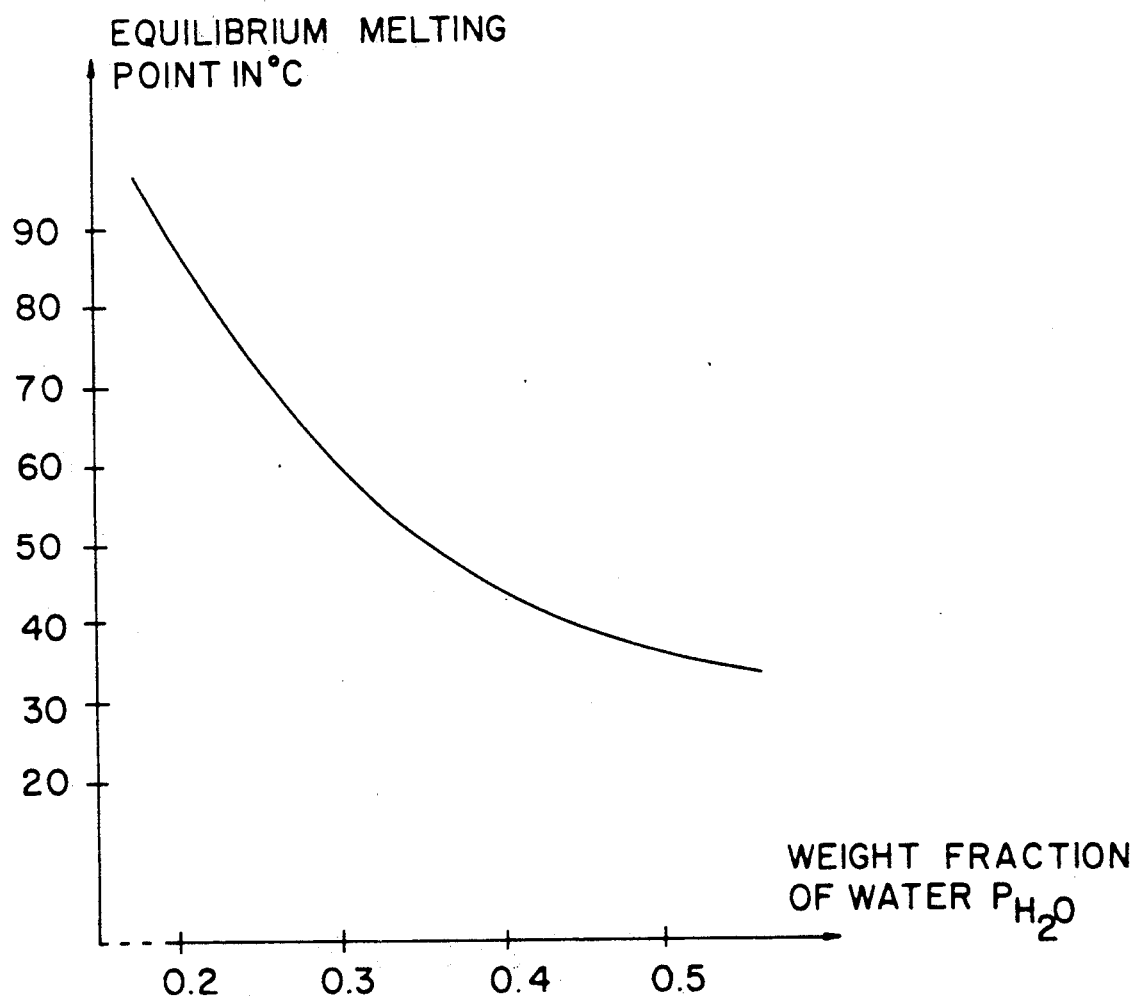

The polyvinyl alcohol used to prepare the polyvinyl alcohol granules or flakes is a compound of high purity, that is to say a highly hydrolyzed polyvinyl alcohol (typically produced by hydrolysis of polyvinyl esters) having a low ester number, i.e. less than 20.

From this group of polyvinyl alcohols having a low ester number, it is preferred to select those alcohols having a proportion of syndiotactic units (or degree of syndiotacticity) of more than 50% by weight, an ash content of less than 1.5% by weight and a proportion of abnormal structural elements, such as 1,2-glycol linkages, of less than 1.5 abnormal linkages per 100 monomer units.

Those polyvinyl alcohols of such type which have an ester number of less than 10 are very particularly preferred.

The molecular weight of the polyvinyl alcohol is not critical in nature, in contrast to what happens if an aqueous solution of polyvinyl alcohol is used according to the prior art described above. If the degree of polymerization is characterized by the viscosity of a 4% strength by weight aqueous solution, measured at 20° C. with the aid of an OSTWALD-type viscometer, the entire range of commercial products extending from 3 to 70 cPo can be used.

The polyvinyl alcohol (PVA) film is obtained by plasticizing and melting flakes (granules) of pure PVA containing from 25 to 35% by weight of water at a temperature above the equilibrium melting point of the flakes or granules, and especially at least 100° C. above the equilibrium melting point of the flakes or granules, and less than or equal to 200° C. The melted flakes or granules are then extruded through a die at a temperature above the equilibrium melting point of the polyvinyl alcohol/water mixture, particularly at a temperature in the range of from 5° C. above the equilibrium melting point up to 98° C. This unique process provides a PVA film which is characterized by an extraordinarily low oxygen permeability, as well as water resistance at ambient temperature. Although not wishing to be bound by any particular theory, these unique properties are believed to be due to the precise quantity of water mixed with the polyvinyl alcohol flakes or granules, as well as to the temperature employed during the mixing and extruding steps. These process requirements result in an entirely homogeneous melted system of water-polyvinyl alcohol in which crystalline seeds do not occur so that a film may be extruded without defects such as bubbles being formed. At amounts of water greater than 35%, it becomes difficult to prevent formation of bubbles. Furthermore, outside the narrow range of water content crystal seeds tend to form, especially at the lower operating temperatures.

Thus, as regards the flakes or granules of polyvinyl alcohol to be introduced into the extruder, their water content by weight will be selected within the above range of values such that the molten extrudate does not crystallize rapidly at ambient temperature (20° C.). More precisely, the water content of the flakes is fixed at a value, within the range of from 25% to 35% by weight, most preferably at about 30% by weight. Under these conditions once it has cooled to ambient temperature, the PVA film, or PVA covering/coating deposited on a thermoplastic substrate, immediately loses its sticky character, which enables the film or composite article to be handled easily, without it being necessary to conduct any preliminary partial drying.

The flakes or granules of polyvinyl alcohol are manufactured or prepared in a manner which is itself known, by impregnating a powder of polyvinyl alcohol with the predetermined amount of water, the process being carried out in a suitable mixer at a temperature on the order of 60° C. to 90° C. Within the limits of the amounts of water indicated above, flakes or granules are obtained which do not stick and which thus have a good flowability. The size of the flakes, or granules, in relation to a uniform feed of the extruder, is not at all critical in nature, and same can vary over wide limits.

As above mentioned, one of the essential conditions for carrying out the process according to the present invention consists of carrying out the fluxing and melting of the flakes or granules at a temperature above the equilibrium melting point of the polyvinyl alcohol/water mixture constituting the flakes or granules.

The equilibrium melting point of a mixture of polyvinyl alcohol and water can be calculated from the following relationship $$\frac{10^3}{V_{H_2O}} \cdot \frac{1}{T} - \frac{1}{T} = 3.6 - 0.8 \cdot \frac{V_{H_2O}}{T} \cdot 10^3$$

in which:

$V_{H_2O}$ is the volume fraction of the water in the mixture in question;

T is the equilibrium melting point (° K) of the mixture in question; and

T' is the melting point of the polyvinyl alcohol (493°K)
which is established on the basis of the data provided in the *Journal of Applied Polymer Science*, Volume 20, pages 1,457–1,465 (1976).

The above relationship gives the equation:

$$T(°K) = 1,000 \cdot \frac{1 + 0.8 \cdot V_{H_2O}^2}{2.028 + 3.6 \cdot V_{H_2O}}.$$

Furthermore, the volume fraction of water, $V_{H_2O}$, can be related to the weight fraction, $P_{H_2O}$ as follows:

$$V_{H_2O} = \frac{d_{PVA} \cdot P_{H_2O}}{1 + P_{H_2O} \cdot (d_{PVA} - 1)}$$

in which $d_{PVA}$ represents the density of the polyvinyl alcohol; taking the value 1.29 for $d_{PVA}$, the following relationship is obtained:

$$V_{H_2O} = \frac{1.29 \cdot P_{H_2O}}{1 + 0.29 \cdot P_{H_2O}}.$$

The attached Figure of Drawing depicts a typical graph providing the values of the equilibrium melting point in ° C. (T−273) as a function of the weight fraction $P_{H_2O}$ in the polyvinyl alcohol/water mixture.

The temperature for the fluxing and melting of the polyvinyl alcohol particles (flakes or granules) is selected such as to avoid any phase heterogeneity in the molten mass. Apart from depending on the amount of water used, this temperature depends on the degree and duration of shearing, and it is preferably at least equal to a temperature which is 100° C. above the equilibrium melting point of the polyvinyl alcohol/water mixture in question. Even more preferably, this temperature is selected within the preferred zone indicated above, such as to be within the range from 150° C. and 220° C.

Consider, for example, particles containing water in proportions of about 30% by weight ($P_{H_2O}=0.3$). It should be noted that these proportions are very particularly suitable for carrying out the process according to the invention. The graph of the Figure of Drawing indicates an equilibrium melting point of about 60° C. According to the above, the fluxing and melting of the particles in the extruder will be carried out at a temperature above 60° C. and preferably equal to at least 160° C. Even more preferably, temperatures ranging from 160° C. to 220° C. will be selected.

The operation of fluxing (plasticization) by shearing and melting the particles can be carried out by means of a single-screw or twin-screw extruder. By the term "extruder", there is intended an apparatus which does not contain any dead zone as the material advances. Apparatuses of this kind are well known to this art and as mentioned above can comprise a single or plurality of screws.

As already above mentioned, another of the essential conditions for carrying out the process according to the present invention is the fact that, in the film or coating die, the molten extruded material must have a material temperature which is below the temperature at which the vapor pressure of water is sufficient to cause the expansion of the intended PVA film, coating or covering, in the open air, by the formation of bubbles. More precisely, the temperature of the molten material in the die must be below 110° C., preferably below 105° C.; this temperature is preferably equal to at most 98° C.

In the case where the fluxing and melting of the particles in the extruder is carried out at a temperature above the equilibrium melting point, but below 110° C., especially below 105° C., there is no risk of formation of bubbles in the intended film or coating at the outlet of the die, and the extrusion of the molten material through the die can be carried out immediately without modifying its temperature.

On the other hand, if the fluxing and melting of the particles is carried out at a temperature above 110° C., and it is recalled that this measure corresponds to a very preferable embodiment, the molten extrudate should then be cooled. This cooling can take place in the die itself, or alternatively it can take place before the molten extrudate passes through the die. The cooling must be carried out homogeneously, namely, not just the surface layers, but the entirety of the molten stream must be brought to the selected cooling temperature in a stable manner. The cooling conditions and the distribution of the residence times must also be controlled such as to prevent the appearance of crystal nuclei up to the moment of film formation or of deposition on the thermoplastic substrate. In particular, the temperature of the molten extrudate must be lowered to a temperature below the equilibrium melting point of the mixture of polyvinyl alcohol and water in question.

Finally, according to the above, the temperature of the molten extrudate in the coating die must have a value which is preferably between the equilibrium melting point and 98° C., controlled cooling being carried out if necessary. Even more preferably, this temperature is selected between 5° C. above the equilibrium melting point and 98° C.

In the case where the extent of the cooling is not very great, for example, on the order of a few degrees to about forty degrees, the cooling can be carried out by using a die having a high coefficient of thermal conductivity, and by adjusting the throughput of the molten material to be extruded. It is also possible to use an extruder equipped with a long screw, in which the molten material cools as it advances towards the end of the screw.

According to another preferred embodiment of the invention, the cooling to the desired temperature is carried out before extrusion through the die, with the aid of a cooling-homogenizing device inserted between the end of the sheath of the extruder and the coating die. A simple type of device which can be used for carrying out the invention is any static or dynamic mixer which has the advantage of permitting an efficient and homogeneous heat exchange without a large pressure loss, and of being able to be adapted, by a suitable selection of the number, the geometry and the temperature of the elements, to the extent of the cooling to be carried out. Further details of such a device are set forth in French Patent No. 2,373,385, the disclosure of which is incorporated herein by reference.

Returning to the example of particles containing about 30% by weight of water: the temperature of the molten extrudate in the coating die must be equal to at least 60° C (equilibrium melting point), but below 105° C.; it preferably ranges from 69° C. to 98° C. Temperatures between 65° C. and 98° C. are very particularly suitable.

The polyvinyl alcohol film, coating or covering thus obtained is gelled, non-tacky and bubble-free; it is homogeneous and easily recrystallizable, and has a constant thickness (generally of the order to 0.1 to 2 mm) over its entire surface area. The film, or coated film substrate, or composite film is thus suitable for direct conversion to a monoaxially or biaxially stretched uniform film having good mechanical properties and high impermeability to gases. It is moreover resistant to water at ambient temperature.

The monoaxial stretching operation can be carried out at a temperature of the order of 100° to 130° C. by means of a longitudinal stretching device equipped with a group of low-speed rollers and a group of high-speed rollers, so as to give a longitudinal stretch ratio of the order of 2 to 5.

The biaxial stretching operation can consist of a longitudinal stretching operation followed by a transverse stretching operation or vice versa, the longitudinal stretching operation being carried out as described above.

The transverse stretching operation can be carried out at a temperature of the order of 100° to 150° C., using a transverse stretching device which keeps the film under tension by means of grippers; during this operation, the grippers travel in such a manner that the distance between the grippers measured at right angles to the direction of travel increases with this travel; a transverse stretch ratio of the order of 2 to 8 is generally obtained.

The monoaxially or biaxially stretched PVA film obtained can then be subjected to a heat treatment at a temperature above 130° C. and preferably of between 140° and 220° C. in order to increase further its crystallinity, its water resistance and its gas diffusion resistance.

In this way, it is possible to obtain monoaxially or biaxially stretched PVA films having a constant thickness, generally of between 5 and 200μ.

In an alternative embodiment for forming the polyvinyl alcohol film according to the present invention, the polyvinyl alcohol flakes or granules as defined above additionally contain a permanent, e.g. a non-volatile or only slightly volatile, plasticizer such as ethylene glycol, polyethylene glycol, propylene glycol, glycerol, trimethylolpropane or neopentyl glycol in an amount such that the glass transition temperature of the plasticized polyvinyl alcohol is always greater than 40° C.; preferably, the glass transition temperature of the polyvinyl alcohol does not decrease by more than 30° C., so as to retain the rigidity of the film under the conventional conditions of use as packaging (with the temperature ranging up to 40° C.). The acceptable amount of permanent plasticizer can easily be determined by routine experimentation by measuring the variations of the modulus as a function of the plasticizer content and of the use temperature. However, this amount of plasticizer is insufficient to allow the preparation of a film from polyvinyl alcohol unless the supplementary amount of water, as described above, is added. Generally, the suitable amount of plasticizer will range from about 1 to about 10% by weight of the polyvinyl alcohol. This addition of a very small amount of plasticizer is advantageous since it makes it possible, if necessary, to stop the manufacture of the film during running (for example during melting or during extrusion through the die) and then to continue the operation at any desired time, and to do so without the danger of the material possibly solidifying or gelling so as to block the apparatus, it being possible for this type of solidifying to be caused by evaporation of a part of the water contained in the polyvinyl alcohol. For example, it is advantageous to use up to 6% by weight of glycerol relative to the weight of polyvinyl alcohol, preferably from 3 to 5% by weight of glycerol.

The polyvinyl alcohol films which form the subject of the invention can be used for the preparation of composite films or sheets with a film of thermoplastic material. The composites have high impermeability to gases and aromas, e.g. organic vapors, and can be obtained by directly depositing the polyvinyl alcohol film on a film or sheet of the thermoplastic material, coated on the surface which is to be covered with polyvinyl alcohol, with any of the known adhesives which are compatible with the thermoplastic and with the polyvinyl alcohol.

Among the thermoplastics which can be used there may be mentioned the amorphous polymers, such as standard or high impact polystyrene, polyvinyl chloride, vinyl chloride copolymers, such as, for example, poly(vinyl chloride/acrylonitrile), polyacrylates, and polymethacrylates, polycarbonates, etc.; the semi-crystalline polymers and copolymers such as polyethylene (high and low-density types), polypropylene, polybutene-1, poly(4-methyl-1-pentene), ethylene/propylene copolymers, etc.; the polyamides, such as polycaprolactam, polyamide-6,6, polyamide-11polyamide-12, etc.; and the polyesters such as poly(alkylene glycol terephthalates), poly(alkylene glycol naphthalenates), etc., for example, poly(ethylene glycol), poly-(propylene glycol), poly-(butylene glycol) or poly-(1,4-dihydroxymethylcyclohexane) terephthalates, naphthalenates and hydroxybenzoates, their copolymers and mixtures thereof.

The preferred thermoplastic for forming the base substrate is polypropylene or poly-(alkylene glycol) terephthala A particularly advantageous material consists of the homopolymers of ethylene glycol terephthalate or its copolymers in which the acid component consists of at least 95% of terephthalic acid and the diol component consists of at least 95% of ethylene glycol; the intrinsic viscosity of these polyesters, measured in orthochlorophenol, is preferably between 0.60 and 1.2 dl/g.

According to one embodiment of the invention for forming a composite film the following steps are carried out:

the unstretched polyvinyl alcohol film is directly deposited on an unstretched carrier film formed from the thermoplastic material and coated on its surface which is to be covered with polyvinyl alcohol with an adhesive compatible with the thermoplastic and the polyvinyl alcohol;

monoaxially or biaxially stretching the composite film obtained; and if appropriate, treating the stretched composite film at a temperature above 130° C. and preferably of between 140° and 220° C.

According to this embodiment, the direct deposition of the polyvinyl alcohol film on the adhesive coated film of thermoplastic can be carried out by means of an extrusion-laminating device comprising pressure-regulated (60±10 daN/cm) rolls at a temperature of 50° to 200° C., or by means of a device for forming a complex by discontinuous bonding at a temperature of 60° to 200° C. and under a pressure of the order of 50 to 100 bars.

The operations of monoaxial stretching and biaxial stretching can be carried out under conditions similar to those described above in relation to the monoaxial stretching and biaxial stretching of the polyvinyl alcohol films, per se.

The composite monoaxially or biaxially stretched films can then be subject to a heat treatment at a temperature above 130° C. and preferably of between 140° and 220° C. in order to increase their cyrstallinity and their dimensional stability, as well as their water resistance, their rigidity and their gas diffusion resistance.

A second embodiment of preparation of composite films consists of directly depositing, by laminating, a monoaxially or biaxially stretched polyvinyl alcohol film, which may have been heat-treated, onto a monoaxially or biaxially stretched thermoplastic film or sheet which may have been metallized by known means and is coated on its face which is to be covered with polyvinyl alcohol with an adhesive compatible with the thermoplastic and with the polyvinyl alcohol.

The composite films according to the invention are stretched films possessing a polyvinyl alcohol covering of constant thickness, generally of between 10 and 200μ. They retain the superior mechanical properties of the thermoplastic carrier while having a high gas impermeability.

The gas permeability of a composite film of thickness e, formed from a thermoplastic carrier layer of permeability $\pi_1$ and thickness $e_1$ and a polyvinyl alcohol film of permiability $\pi_2$ and thickness $e_2$ can be described by the equation:

$$\frac{e}{\pi} = \frac{e_1}{\pi_1} = \frac{e_2}{\pi_2}$$

The principal characteristic indicating the effectiveness of the carrier layer is the ratio $\pi_1/\pi_2$:

The use of a stretched or unstretched polyvinyl alcohol film according to this invention, makes is possible to obtain a very high ratio $\pi_1/\pi_2$ and to do so even where the polyvinyl alcohol coating is exposed to a high temperature and to a high relative humidity.

Thus, a ratio $\pi_1/\pi_2$ of the order of 30–100 is achieved for a polyvinyl alcohol/poly(ethylene glycol terephthalate) composite film according to the invention (at a temperature of 30° C. and a relative humidity of 65%), as against a ratio $\pi_1\pi_2$ of 5–10 for a polyvinylidene chloride/poly(ethylene glycol terephthalate) composite film and of 5–20 for a polyacrylonitrile/poly(ethylene glycol terephthalate) composite film under the same conditions and using oxygen or $CO_2$ as the diffusing gas.

In the present invention, after stretching and preferably after thermal treatment, the resulting PVA films or PVA composite films are highly crystalline and are water-resistant, i.e. their impermeability to gases is not adversely effected under high humidity conditions or in contact with water.

The polyvinyl alcohol films obtained by the classical prior art processes do not possess the unique characteristics of the instant polyvinyl alcohol films.

For instance, referring to Table 1, in column 5 of the above-mentioned patent to Roullet, oxygen permeabilities at 0% relative humidity as low as $$\frac{1 \text{ cm}^3 \cdot \text{cm}}{\text{cm}^2 \cdot S \cdot \text{cmHg}} \times 10^{12}$$

are obtained for a single layer of the PVA coating. Lower oxygen permeabilities can be achieved when two or more layers are used as shown by the Example 2 of the patent.

In contrast, as can be seen from the barrier property reported hereinbelow in Example 1, the polyvinyl alcohol film of the subject invention has an oxygen permeability as low as 0.05 measured at a relative h-umidity of 74%. The film of Example 4 reported hereinbelow has an oxygen permeability at 23° C. and 50% relative humidity which was below the limit of measurement.

It can, therefore, be readily understood that the PVA films obtained by the process of the present invention are completely different from conventional PVA films.

The shape of the dies used to form the PVA films and composites can be arbitrarily selected, for example, flat films can be prepared with flat dies, T-dies, etc. Annular dies can be used to prepare hollow cylinders.

It is, of course, possible to improve the mechanical protection of the composite films according to this aspect of the invention, or to improve their sealability, by coating the polyvinyl alcohol covering with a latex (for example polyvinylidene chloride) or a molten polymer (for example polyethylene).

The composite films can be used as such with or without stretching, for example, as wrapping or packaging material, to form pouches, for example, by heat sealing two such composite films along the outer edges thereof, or by folding a single sheet transversely and heat sealing the remaining edges, etc. Alternatively, the composite films can be transformed into shaped articles by the usual shaping or molding techniques, including, for example, pressure molding, draw-molding; draw-blow molding; stamping, etc.

However, in a specific and preferred embodiment of the invention, the polyvinyl alcohol film is used to construct a biaxially oriented hollow shaped article. As in the above described aspect of the invention directed to the production of polyvinyl alcohol films this aspect of the invention similarly involves the steps of (a) introducing the high purity polyvinyl alcohol flakes (or granules) having the specified water content (e.g. 30% by weight) into an extruder; (b) fluxing and melting the flakes at a temperature above the equilibrium melting point of the polyvinyl alcohol/water mixture constituting the flakes. In this particular embodiment the steps (a) and (b) are followed by the step (c) forming a barrier covering of the molten mass of flakes from step (b) on a substrate of the thermoplastic tubular blank, parison or preform under conditions such that the temperature of the molten mass has a value which is at least equal to the equilibrium melting point of the polyvinyl alcohol/water mixture in question, but is below the temperature at which the vapor pressure of the water is sufficient to cause the expansion of the intended covering, in the open atmosphere, by the formation of bubbles; and step (d) biaxially orienting and blow molding the barrier covered substrate into a final configuration. In this case, the step (c) will generally involve the use of an extrusion die or coating die which is suitable for coating a tube, a parison or a preform, as the case may be.

An additional step (c') taking-up the coated tube parison or preform, may, as desired, be preformed, followed by subsequent molding, shaping, stretching, and/or orientation. For example, in the case of a tube, the coated be converted to a tubular blank, parison or tube section, as a precursor of a preform, by cutting to the desired length.

In a preferred embodiment of this aspect of the invention the steps (a) and (b) are first carried out and then the step (c-1) in which a tube is coated by lamination. In this case, the lamination can be carried out directly in line with the extrusion of the tube fabricated from thermoplastic material.

In alternative embodiments in which the water-resistant polyvinyl alcohol barrier layer is formed into a separate casing or sleeve, the step (c) can include the steps (c-2) and (c-4) or the steps (c-3) and (c-4):

(c-2) extrusion-blow molding the molten material through an annular die under the conditions of temperature defined above, in order to form a casing; or alternatively, (c-3) extruding the molten material in the form of a tube, followed by a calibration operation, in accordance with the technique for the manufacture of tube rings, with the aid of a movable shaper with smooth walls, using a slight internal air pressure, again under the above defined temperature conditions, to form the desired casing; and (c-4) applying the casing, optionally after transverse cutting, as a sleeve to a substrate, i.e. tubular blank, parison or preform. Preferably, the sleeve is applied to a preform. In this case, the covering operation may be carried out simply by covering the stretchable straight part of the preform which extends from the base of its neck as far as the beginning of its closed end.

The thermoplastic material used for fabricating the tube, parison or preform may be any of the thermoplastic polymers mentioned above for the fabrication of the composite articles.

The production of a covering with good properties depends essentially on observing the conditions described above. It should be noted that, in order to facilitate the adhesion of the covering to the substrate, it is also possible to carry out a prior treatment of the thermoplastic surface, for example, by corona discharge, by flaming or by the deposition of an adhesion-promoting "primer" or an adhesive. The use of an intermediate layer of adhesive is particularly recommended in the case where the covering operation is carried out by applying a sleeve to a tube, a parison or a preform. As the adhesive, it is possible to use, in particular, a polyurethane-based adhesive in solution, the deposition of the adhesive being followed by gentle drying so as to remove most of the solvent, without the intermediate layer reaching too high a viscosity. It too should be noted that the intermediate layer of adhesive can equally well be deposited on that surface of the covering which is to be brought into contact with the base thermoplastic. In general, the amount of adhesive deposited, measured after removal of the solvent, is between about 1 and 8 g per m$^2$ of base thermoplastic material/covering interface.

As regards the final conversion, to a biaxially oriented hollow shaped article, of the covered substrate i.e. tubular blank, parison or preform, the following details are given.

In the case of the covered tubular blank, it can be used as such to obtain, by biaxial stretching-blow molding, long biaxially oriented profiles of any cross-section and transverse section, using, for example, the technique which is described in U.S. Pat. No. 4,421,711, the disclosure of which is incorporated herein by reference thereto. This technique consists of the following operations: the tubular blank, preheated to the biaxial orientation temperature of the material, is placed along the axis of a mold having the shape and the dimensions of the profile to be obtained; an internal pressure is applied in order to cause the uniform longitudinal stretching and, simultaneously, a uniform radial pre-blowing at least up to the natural biaxial stretching ratio of the material; the internal pressure is increased in order to expand the blank completely against the walls of the mold such as to cause a transverse overstretching; the profile is cooled and the pressure is then relaxed. The biaxially oriented profiles obtained can be used, for example, for conveying fluids under pressure, as protective tubes for lighting, or, after cutting, as container bodies in the packaging industry. To produce container bodies, the shape of the profile is selected such as to correspond to the replica of that of the elements which it is desired to obtain. It can be advantageous to provide a projecting groove or a channel in the region of each element, cutting taking place at the channel, which facilitates the subsequent fixing of the separately produced ends, made of metal or plastic, to the container bodies by crimping or welding. The containers obtained can advantageously be used for storing highly carbonated liquids and very oxygen-sensitive foodstuffs or comestibles.

The tubular blank can also be converted to parisons by cutting. As regards the covered parison, they are generally first closed at one or both of their ends, either by stamping with a die, or by fitting thereto an end made of metal or plastic, by crimping or welding, before they are converted to biaxially oriented hollow shaped articles (container bodies, flasks, bottles or the like) by biaxial stretching-blow molding, using the known conventional techniques.

As regards the coated preforms, they may be directly biaxially stretched-blow molded using the same known conventional techniques.

The temperature to which the tubular blank, the parison or the preform is heated in the biaxial stretching-blow molding step depends on the nature of the thermoplastic constituting the base substrate. If the base substrate is a polyester, a temperature between the glass transition and the crystallization temperature, namely, a temperature from 85° to 120° C., is generally suitable.

The hollow shaped articles obtained retain the characteristics of the non-composite hollow shaped articles as regards their impact strength, their gloss and their transparency. As regards the thickness of the coating, the technique described above, compared with that using coating by an aqueous process, makes it possible to obtain immediately, from but a single operation, a thicker covering which can range from 10 to 200μ; the hollow shaped articles covered in this manner are now perfectly suitable for the packaging of highly carbonated and/or oxygen-sensitive liquids.

Another advantage is the fact that a thicker coating layer is obtained without giving rise to any requirement to remove water. In fact, it has been observed that, in contrast to the case of an aqueous coating, the tubular blanks, parisons or preforms according to the invention, the thickness of the coatings of which can range from 0.1 to 2 mm, are easily stretchable under the same stretching conditions as those of the uncoated thermoplastic, without the need to conduct prior drying of the coating layer. The fact that partial drying can nevertheless take place during the possible storage of the tubes, tubular blanks, parisons or preforms and/or during their preheating before biaxial stretching-blow molding does not constitute a problem either with respect to the behavior on stretching or with respect to the properties of the finished hollow shaped articles.

By proceeding in accordance with the preferred embodiment above outlined, especially as regards the water content of the PVA granules or flakes and the melting point of said granules or flakes, the process according to the present invention will provide polyvinyl alcohol films, including flat and shaped films, tubes, rings, etc., composite films and shaped articles, including specifically hollow shaped articles, the polyvinyl alcohol film or coating layer of which is water-resistant without having been subjected to a heat after-treatment at high temperatures. The term "water-resistant" is to be understood as connoting that the film or coating layer is insoluble in cold water and, if appropriate, gives rise only to swelling, without immediate dissolution, when it is immersed in water heated to a temperature as high as 60° C. Utilizing the earlier technique of coating by means of an aqueous process, the resistance of the coating layer to water could only be obtained provided that the layer of polyvinyl alcohol was subjected, before or after biaxial stretching, to a heat treatment at a temperature above 130° C. and preferably between 140° C. and 210° C. The purpose of this heat after-treatment is to develop the crystallinity of the coating and consequently to improve its physical properties, including the insolubility in water. With the technique comprising the present invention, however, it is possible to immediately obtain a coating which is crystalline and water-resistant. Of course, by including a step of a heat after-treatment at temperatures above 130° C. and as high as 140° C. to 210° C., e.g. by maintaining the film, coated substrate or the shaped article in intimate contact with the wall members of a hot mold, further improvements in physical properties and water resistance can be obtained.

In the examples which follow, the crystallinity of the stretched or unstretched polyvinyl alcohol was measured by determination of its refractive index n (in the case of isotropic polyvinyl alcohol) or of its average refractive index n̄ (in the case of anisotropic pol-yvinyl alcohol), which is the arithmetic mean of the three principal refractive indices, determined on an ABBE refractometer in polarized light, in the principal directions of orientation in the plane of the coated film ($n_1$, $n_2$) and in the orthogonal direction ($n_3$). As the presence of water in the polyvinyl alcohol significantly lowers the refractive index or average refractive index, the crystallinity must be measured on a totally dry basis. In order to prevent the drying conditions from modifying the crystallinity of the polyvinyl alcohol film or coating layer, the residual water was removed by drying in vacuo without exceeding 60° C.

As described above, it is envisaged, without departing from the scope of the present invention, to further increase the protection of the resulting polyvinyl alcohol films, composites, hollow shaped articles, etc. by means of another coating of polymer, applied to the polyvinyl alcohol film or composite or to the tubular blank, the parison or the preform or to the finished shaped article. This "new" coating can be deposited by any known technique such as coating using a latex or a molten polymer, coextrusion-coating, or encasing with a molten polymer. It is also included to apply a sleeve of stretchable or shrinkable polymer to the shaped article, it is being possible for the application to be carried out, in particular, on the bottling line, before or after filling, in the case of hollow bodies used as bottles or containers. The sleeve can be produced by the transverse cutting of a casing obtained either by extrusion-blow molding (the most common case of casings of low-density polyethylene, polypropylene, ethylene/vinyl acetate, ionomeric resin or acrylonitrile copolymer) or from a flat film rolled up and welded or adhesively bonded (the case of PVC. and polyvinylidene chloride). Of course, the sleeve can contain various adjuvants, in particular colorants and UV absorbers, and it can be transparent or opaque and printed or unprinted. It is not necessary for the sleeve to cover the entirety of the surface of the hollow shaped article. For example, in the case of bottles or flasks, only the straight cylindrical part may be protected, the bottom and the neck being excluded.

In order to further illustrate the present invention and the advantages thereof, the following specific examples are given, it being understood that same are intended only as illustrative and in nowise limitative.

EXAMPLE 1

A commercially available polyvinyl alcohol powder bearing the trademark RHODOVIOL 30-5 from Societe RHONE-POULENC and having the following characteristics is used:

| | |
|---|---|
| ester number | 5 (corresponding to a degree of hydrolysis of 99% by weight or of 99.5 mole %) |
| viscosity of a 4% strength by weight solution measured as 20° C. in an OSTWALD viscometer | 28 centipoises |
| ash content | <1% by weight |
| degree of syndiotacticity | 54% of syndiotactic triads; the measurement is carried out at 80° C. in heavy water using a C VARIAN CFT 20 nuclear magnetic resonance spectrometer, in accordance with the method of INOUE, et al (Polymer Journal 1973, page 244) and of WU and OVENAL (Macro-molecules 1973, page 582) |
| 1,2-glycol chain members | 0.66 chain member per 100 monomer units. |

The polyvinyl alcohol powder is washed cold in a centrifuge, and about 40% of water is then introduced into a slow-running mixer having sigma-shaped paddles (an apparatus from Societe GUITTARD). The vessel of the apparatus is heated to 80° C. by means of a double jacket and stirring is continued for 1 hour once the temperature of the moist material has reached 75° C.

When this mixing has been completed, the vessel is cooled by means of its double jacket and the product which has thus been homogeneously impregnated is discharged. It has good free-flowing characteristics, without the slightest tendency for the granules to stick together. The water content, as checked by measuring the loss of weight in an oven, is between 31 and 31.6%.

The polyvinyl alcohol thus swollen with water is charged into the hopper of an ANDOUART single-screw extruder (diameter 60 mm, length 20 D) having 3 heating zones and equipped with a flat 1 mm die 20 mm wide. A static cooler of the ROSS type, having a 20 mm diameter drum and possessing two hot zones, is interposed between the end of the barrel and the die.

The working conditions are as follows:

| extruder | inlet: 90° C. |
| --- | --- |
| | center of the extruder body 200–210° C. |
| | end: 170° C. |
| | throughput: of the order of 6 kg/h |
| | speed of rotation of the screw: 27 rpm |
| cooling device | 1st zone: 110° C. |
| | 2nd zone: 95° C. |
| | speed of rotation of the drum: adjustable |
| die | 95° C. |

An unstretched film is obtained, the thickness of which varies according to the speed of running of the cooling drum: from 200μ for example for a speed of 240 revolutions per hour to 800μ for example for a speed of 60 revolutions per hour. The characerics of the film obtained are given below, firstly when the film is dried in vacuo at a temperature below 80° C. and secondly when it is heat-treated for 2 minutes at 190° C. after having been dried in vacuo at a temperature below 80° C.

a) Characteristics of the film dried in vacuo at a temperature below 80° C.

Crystallinity

The crystallinity is measured on an ABBE refractometer at 23° C., by determining the extreme values of the refractive index $n_1$ and $n_2$ in the plane of the film and the value $n_3$ measured at right angles to the plane of the film.

These values are as follows:

| $n_1 = 1.5460$ | corresponding to $\bar{n} = 1.5413$ |
| --- | --- |
| $n_2 = 1.5400$ | |
| $n_3 = 1.5380$ | |

Barrier property

The oxygen permeability is measured at 25° C. and 74% relative humidity, using a mass spectrometer.

The value found is as follows:

$$\pi = 0.05 \times 10^{-12} \ cm^3/cm/cm^2/s/cm.Hg$$

b) Crystallinity of the film dried in vacuo at a temperature below 60° C. and then heat-treated for 2 minutes at 190° C.

The values of the refractive indices for these conditions are as follows:

| $n_1 = 1.5488$ | corresponding to $\bar{n} = 1.5479$ |
| --- | --- |
| $n_2 = 1.5440$ | |
| $n_3 = 1.5510$ | |

EXAMPLE 2

Granules of polyvinyl alcohol containing about 30% of water and additionally containing 3% by weight of glycerol relative to the weight of polyvinyl alcohol are prepared as in Example 1. The glycerol is introduced at the same time as the water into the slow-speed paddle mixer.

The extrusion operation as described in Example 1 is started; after having run for 1 hour, the operation is stopped for 10 minutes and is then resumed.

It is found that the product present in the extruder has remained supple and does not interfere with the continuation of the operation.

The characteristics of the film obtained are similar to those of the film obtained in Example 1.

EXAMPLE 3

An unstretched 800 thick film of poly(ethylene glycol terephthalate) having a viscosity of 0.64 dl/g (intrinsic viscosity measured in o-chlorophenol) is used. The film is coated with a 10% strength by weight solution of the adhesive PENTACOLL ET 691 A from Societe WIKOLIN in ethyl acetate.

After the adhesive has dried, the 200 microns polyvinyl alcohol film obtained in Example 1 is applied by laminating under a pressure of 60 daN/cm, using 2 rolls internally heated to 150° C., the average lamination speed being 4 m/min.

The composite film is then subjected to the following treatments passage over slow-speed rollers at a temperature of 80°–90° C. and then over high-speed rollers at about 100°–105° C. to give a film having a stretch ratio of 4.5;

transverse stretching in a ratio of 3.3 on a stenter at 110° C.;

heat treatment under tension in an oven at a temperature of 190° C.

The biaxially stretched composite film thus obtained has the following characteristics:

mean refractive index $\bar{n} = 1.5448$ oxygen permeability (25° C. and 74% relative humidity)

$$\pi = 0.39 \times 10^{-12} \ cm^3/cm/cm^2/S/cm.Hg$$

EXAMPLE 4

A 35μ thick composite based on biaxially oriented heat-sealable polypropylene (trademark PRYPHANE, manufactured by Rhone-Poulenc Films), obtained by coextrusion of a polypropylene film and a film of a propylene-ethylene copolymer containing 4% by weight of ethylene, followed by biaxial stretching, is used.

A 200μ thick polyvinyl alcohol stretched polyvinyl alcohol is passed over a hot roller at 190° C.

The composite based on polypropylene and the polyvinyl alcohol film are combined by bonding with PENTACOLL ET 691 A adhesive from WIKOLIN.

A perfectly heat-sealable composite film is obtained.

Its oxygen permeation at 23° C. and 50% relative humidity is measured by means of an OXTRAN apparatus.

It is found that the permeation is below the limit of measurement.

By way of comparison, the oxygen permeation, under the same conditions and in the same apparatus, of the 35μ thick composite based on polypropylene is about 1,000 cm³/ m²/24 h.

COMPARATIVE EXAMPLE 1

This is a comparative example demonstrating the prior art technique of coating utilizing an aqueous process.

A commercial polyvinyl alcohol having the trademark RHODOVIOL 30-5 of RHONE-POULENC. as described in Example 1 was employed to prepare a 15% strength aqueous solution (weight of polymer/weight of solution), which was then used to coat, at 50° C., by dipping, transparent injection-molded preforms fabricated from polyethylene terephthalate (RHODESTER 85 TX polymer of RHONE-POULENC., possessing an intrinsic viscosity of 0.83 dl/g). After dipping and draining, a relatively uniform coating layer was deposited on the preforms, the average thickness of which when measured after complete drying, was 27µ.

The crystalline state of the coating layer, dried to constant weight at 60° C. in a vacuum oven, was also determined. The measurement was carried out on an ABBE refractometer at 23° C. in order to find the extreme values of the refractive index, $n_1$ and $n_2$, in the plane of the film, and the value $n_3$, measured perpendicularly to the plane of the film.

These values were:

$n_1 = 1.5299$        namely, $\bar{n}$ 1.5293
$n_2 = 1.5299$
$n_3 = 1.5282$

The mechanical properties and resistance to water of a fragment of polyvinyl alcohol coating thus obtained was tested after it had been separated from the polyester substrate; the following results were obtained:

(1) modulus of elasticity under traction (measured at 23° C. on the dried product): E=5,885 MPa.

(2) resistance to water: immersion in water 60° C. for 15 minutes; a rapid dissolution was observed.

The poor resistance to water of the coating on the preforms was also apparent on contact with moist fingers: the initial impression rapidly results in perforation of the coating by simply rubbing at ambient temperature.

The preforms coated in this manner were for the manufacture of bottles having large capacity (1.5 l) by biaxial stretching under air pressure, after preheating of the coated preforms in a hot air oven at 100° C.

The stretching ratios to which the coating was subjected were, respectively, 2.5 in the longitudinal direction and 3.8 in the transverse direction, which reduced the thickness of the polyvinyl alcohol film from 27 to 2.84µ (in the dry state).

As the blowing mold was cold, mold release was carried out immediately after blowing. This yielded a transparent bottle which had an attractive appearance and the crystallinity characteristics of the external coating of which were analyzed with the aid of a refractometer. Since the stretching had reduced the thickness of the polyester to a value close to 300µ, it was now possible to analyze the optical characteristics of the coating layer without separating it from the stretched polyester substrate. For this purpose, a disc having a diameter of 5 mm was cut from the central part of the bottle with the aid of a punch, and care was taken to place the face coated with polyvinyl alcohol in contact with the measuring prism.

It was found that the values measured on the stretched film still changed substantially if the drying of the film was completed, and stabilized at the following values on a sample dried at 60° C. in a vacuum oven:

$n_1 = 1.5370$       namely, $\bar{n} = 1.5290$
$n_2 = 1.5330$
$n_3 = 1.5170$

A test for the resistance to water of the stretched film at ambient temperature, carried out by simply bringing the bottle into contact with moist hands, evidenced a great sensitivity of the coating, which rapidly disintegrated. When a sample of the coating layer separated from the substrate was immersed in water at 60° C. for 15 minutes, complete dissolution of the coating layer was detected.

In the description immediately to follow, the influence of a heat after-treatment on the change in the crystallinity and in the resistance to water on the unstretched and stretched polyvinyl alcohol coating layer will be illustrated:

Unstretched coating

Samples of the unstretched polyvinyl alcohol coating after having been separated from the polyester, were taken from the preform and were successively dried at 60° C. in vacuo and then subjected to a heat treatment at increasing temperatures ranging from 100° C. to 170° C.; the duration of the treatment was 10 minutes and care was taken to ensure that the samples in intimate contact with the heated metal plates used for this treatment.

The following values were obtained for the average refractive index of the samples treated in this manner and for their resistance to water at 60° C. for 15 minutes:

TABLE I

| Temperature | $\bar{n}$ | Resistance to water |
|---|---|---|
| 100° C. | 1.5356 | solubility |
| 120° C. | 1.5378 | very slight solubility |
| 130° C. | 1.5406 | insolubility |
| 150° C. | 1.5421 | insolubility |
| 170° C. | 1.5433 | insolubility |

Stretched coating

A series of 1.5 l bottles prepared as indicated above was used. These bottles were subjected to a heat treatment at increasing temperatures ranging from 100° C. to 170° C. To carry out same, each bottle was placed for 15 seconds in intimate contact, by use of pressure, with the wall members of a mold heated to the selected temperature. After the heat treatment, a disc of a diameter of 5 mm, comprising the substrate/coating composite, was cut from the central region of each bottle. The samples collected were dried at 60° C. in vacuo and each of them was then subjected to measurement of the average refractive index. As regards the test for the resistance to water, this was carried out by immersing, in water at 60° C., for 15 minutes, a fragment of coating layer separated from the polyester substrate by tearing. The following results were obtained:

TABLE II

| Temperature of the mold | $\bar{n}$ | Resistance to water |
|---|---|---|
| 100° C. | 1.5298 | solubility |
| 120° C. | 1.5342 | solubility |
| 140° C. | 1.5372 | insolubility |
| 160° C. | 1.5387 | insolubility |
| 170° C. | 1.5402 | insolubility |

It was, therefore, apparent that, for this type of polyvinyl alcohol coating deposited by means of aqueous coating, it was necessary to carry out a severe heat after-treatment in order to obtain a stretched or unstretched water-resistant coating. It i estimated that the unstretched coating becomes water-resistant for values of the average refractive index of more than 1.5380. In the case of the stretched coating, it is estimated that it becomes water-resistant for values of the average refractive index of more than 1.5360. If the coating wa water-resistant, disintegration and perforation of the polyvinyl alcohol film were no longer observed on contact with moist fingers.

EXAMPLE 5

The same grade of polyvinyl alcohol, RHODOVIOL 30-5 powder, was used to prepare flakes containing about 30% by weight of water, for the purpose of extruding same without any other plasticizing additive. Beforehand, the powdered alcohol was washed under cold conditions in a centrifuge, and the amount of water, in approximately 10% excess relative to the intended amount, was then introduced into a slow mixer with sigma-shaped blades (apparatus from GUITTARD). The vat of the apparatus was heated to 80° C. by means of a jacket, and agitation was maintained for 1 hour once the temperature of the moist material had reached 75° C.

Once the mixing had been terminated, the vat was cooled by means of its jacket and the product homogeneously impregnated in this fashion was discharged. It had a good flowability without the least tendency of the flakes to stick. The water content, determined by the weight loss in an oven, was between 31 and 31.6%. The flakes were stored in a closed bag in order to be maintained without loss of water, until the extrusion step.

The polyvinyl alcohol swollen with water in this manner was fed into the hopper of an ANDOUART-type single-screw extruder (diameter 60 mm, length 20 D) with 3 heating zones, equipped with an annular die which enabled dispensing of the flow of material peripherally around a tube which was guided such as to be concentric with the axis of the die. A ROSS-type static mixer, composed of 5 elements having a diameter equal to 2 inches, arranged in a sheath heated electrically according to two separately controlled zones, was inserted between the end of the sheath and the die. The temperature profile of the extrudate was equilibrated, under uniform operating conditions, as follows:

| (i) Extruder | inlet: 90° C. |
|---|---|
| | middle of the body of the extruder: 200–210° C. |
| | end: 170° C. |
| (ii) Cooling device | 1st zone: 110° C. |
| | 2nd zone: 95° C. |
| (ii) Die | 95° C. |

The speed of rotation of the screw was set at 27 rpm. Because of the pressure loss in the die, the opening of which was calibrated for a deposit having a nominal thickness (in the unstretched state) of 800μ, the throughput of the extruded product was on the order of 6 kg/hour.

The polyvinyl alcohol was deposited on an extruded tube of amorphous polyethylene terephth-alate, separately prepared from RHODESTER 85 TX of RHONE-POULENC., the external diameter of the tube being 24.8 mm. The speed of travel of the tube was set such as to adjust the thickness of the coating to a value of 450μ, this thickness being measured on the dried coated tube.

The coating layer obtained was perfectly transparent and free of bubbles or particles, and no rewelding line, due to the separation of the flow in the die, was apparent. Moreover, it was found that it was possible to pick up the covered tubes as soon as the covering had returned to ambient temperature, because they did not have a tacky or sticky nature: Under these conditions, the coated tubes could be cut with a saw without risk of damage to the coating layer, due to contact with the transfer systems.

In order to determine the crystalline state of the polyvinyl alcohol extruded in this manner, a fragment of coating layer was dried at 60° C. in vacuo and its refractive index was measured. The following values were obtained after removal of all residual moisture:

| $n_1 = 1.5460$ | namely, $\bar{n} = 1.5413$ |
|---|---|
| $n_2 = 1.5400$ | |
| $n_3 = 1.5380$ | |

The tensile strength test carried out on this material evidence a substantial increase in its modulus of elasticity, which had a value of 6,750 MPa, compared with the control obtained from an aqueous solution (Comparative Example 1).

The test for resistance to water evidenced that this coating was insoluble at ambient temperature (20° C.) and was not altered on contact with moist fingers. On immersion in water at 60° C. for 15 minutes, the coating remained insoluble.

Two batches of polyester tubes coated as indicated above were used for the manufacture of biaxially oriented bottles, two methods of closure being successively used.

First method

The batch of tubes in question consisted of tubes having an initial thickness of polyester of 0.8 mm. They were cut to a length of 10 cm. In this first method, metal inserts were fixed, by crimping, to both ends of each section of tube. One of these inserts was a blind metal piece serving as the bottom, and the other insert served as a neck and was hollow. These parisons were preheated in hot air at 100° C. and blown in a cold metal mold. In this operation, the material was stretched only slightly in the longitudinal direction, and the transverse stretching ratio was less than 3 (between 2.6 and 2.9).

After drying at 60° C. in vacuo, the refractive indices of the stretched product were analyzed by cutting a sample of wall from the central region of the bottles obtained and by taking care to ensure that the surface in contact with the prism of the refractometer was indeed the one which was coated.

The values obtained were as follows:

| $n_1 = 1.5420$ | namely, $\bar{n} = 1.5382$ |
|---|---|
| $n_2 = 1,5380$ | |
| $n_3 = 1.5345$ | |

The coating was perfectly insensitive to touch with moist fingers and was insoluble in water at ambient temperature (20° C.). It was also insoluble in water at 60° C. for 15 minutes.

Second method

After cutting, the second batch of coated tubes, having an initial thickness of polyester of 3.5 mm, was used to produce, by preheating and stamping the bottom and the neck with a die on a CORPOPLAST VBE 3 laboratory machine, preforms which were closed at one end and which could be blown.

These preforms were used for blowing bottles having a capacity of 1.5 l and a weight of 55 g, and same were subjected to a degree of stretching which reduced the thickness of the material and of its coating in a ratio of 1 to 9.5 for the central portion.

The preheating of the preforms was carried out in contact with a metal mold consisting of two heated half-shells, which ensured a good heat distribution within the preform; the blowing temperature was 95° C. The moisture content of polyvinyl alcohol at the time of blowing was determined to be equal to 1.6% by weight.

After biaxial stretching, the coating had an average thickness of 47μ. Without evidence of any particular problem, it was possible to carry out the blowing under various temperature conditions between 90° C. and 110° C., as with an uncoated polyester preform. The bottles obtained had a glossy and smooth appearance. It was observed that there was no need to dry the preforms before hand, it being possible for the water content of the preforms at the biaxial stretching stage to vary significantly without detracting from the quality of the blowing.

After drying in vacuo at 60° C., the refractive index of the stretched coating wa measured, the measurement being carried out directly on the bottle/coating assembly using a punched-out sample.

The following values were obtained:

$n_1 = 1.5510$     namely, $\bar{n} = 1.5377$
$n_2 = 1.5360$
$n_3 = 1.5260$

Although, under the effect of more pronounced stretching. an average value was obtained which was substantially lower than that recorded in the first method, the crystallinity of the coating was more than sufficient to provide a covering which was water-resistant at 20° C. or resistant to being touched by moist hands, which affected neither the appearance nor the stability thereof. This coating was also water-resistant at 60° C. for 15 minutes.

COMPARATIVE EXAMPLE 2

The same conditions for the preparation of polyvinyl alcohol flakes as those described in Example 5 were used, but the extrusion temperature in the ANDOUARD extruder was now lowered such that the temperature in the central body did not exceed 140° C., namely, a temperature which was only about 82° C. above the equilibrium melting point of the mixture of polyvinyl alcohol and water in question.

Difficulties were observed as regards the flow of the product though the die was maintained at 95° C., because of the appearance of a rougher surface state of the coating film. The refractive index of the covering was measured on an unstretched polyvinyl alcohol fragment separated from the tube before hand and dried to constant weight at 60° C. in vacuo;

The following value were obtained:

$n_1 = 1.5400$     namely, $\bar{n} = 1.5373$
$n_2 = 1.5390$
$n_3 = 1.5330$

This coating did not prove to be completely water resistant.

EXAMPLE 6

The experiments described in Example 5 were repeated, the second method being selected for the manufacture of the hollow shaped article, and a polyvinyl alcohol having the trademark POVAL H of KURARAY being used. It had the following characteristics:

| (i) Ester number | 5 |
|---|---|
| (ii) Viscosity of a 4% strength by weight aqueous solution | 30 centipoises |
| (ii) Ash Content | <1% by weight |
| (iv) Degree of syndiotacticity | 52.5% |
| (v) 1,2-glycol linkages | 0.40 per 100 monomer units. |

Flakes containing 35% by weight of water were prepared with the aid of a GUITTARD mixer and the flakes were extruded at 210° C. on an ANDOUART extruder, care being taken to lower the temperature of the extruded material to 95° C. before it was extruded through the die. The usual measurement tests were carried out on the coated preform and on a bottle biaxially oriented at 100° C., which had been subjected to a planar stretching of 11.5. A coating which was directly water-resistant was obtained in both cases and its average refractive index, measured after drying at 60° C. in vacuo until the water had been removed, had a value of 1.5420 on the preform and 1.5380 on the bottle.

COMPARATIVE EXAMPLE 3

Polyvinyl alcohol of the RHODOVIOL 30-5 type from RHONE-POULENC. was used to prepare flakes containing an increased amount of water: the water content of the flakes was adjusted to 55% by weight. When the flakes exited the mixer, it was observed that the flakes had a marked tendency to agglomerate, which made the feed of the ANDOUARD extruder difficult and non-uniform.

Because of the high water content of the flakes, the product was extruded directly without passing via a ROSS-type cooling device, because the temperature in the body of the extruder was fixed at 135° C. in this case. By simply varying the throughput of the molten extrudate, it was possible to bring its temperature in the die to the desired value of 95° C. The polyvinyl alcohol was deposited on an extruded tube made of the same polyethylene terephthalate as that mentioned in the previous examples.

It was observed that the tubes coated in this manner tended to give rise to a high degree of stickiness of the cooled but undried coating, and were consequently difficult to use.

The refractive index of the unstretched covering dried at 60° C. in vacuo was measured:

$n_1 = 1.5360$     namely, $\bar{n} = 1.5333.$
$n_2 = 1.5340$

-continued $$n_3 = 1.5300$$

The coating proved to be soluble in water at 20° C. coating by preheating it to 95° C. with the aid of a hot air oven. With a stretching ratio of 4, a film was obtained which had the following refractive index values when it had been dried at 60° C. in vacuo:

| $n_1 = 1.5470$ | namely, $\bar{n} = 1.5327$, |
| $n_2 = 1.5280$ | |
| $n_3 = 1.5230$ | |

The stretched sample was still soluble in water at 20° C.

EXAMPLE 7

Flakes containing about 30% by weight of water were prepared from the polyvinyl alcohol RHODOVIOL 30-5 described in Example 1, and a polyvinyl alcohol casing having a diameter of 25 mm and a wall thickness of 300µ was then produced by extrusion. The fluxing of the polyvinyl alcohol/water mixture, its mixing and its extrusion at high temperature, followed by cooling before extrusion through the die, were carried out under the conditions described in Example 5.

The casing formed during extrusion through the annular die was taken up not on an internal substrate (a tube guided such as to be concentric with the axis of the die, as in Example 5), but on a movable shaper which enclosed the casing on either side by means of two half-molds having smooth walls, which constituted the opposite elements of the lower and upper parts of a movable caterpillar. When the casing formed had been squeezed at its end, it could be blown inside this moving mold by blasting air inside thereof.

The casing formed was cut into elements having a length equal to 100 mm. These elements were subjected to moderate drying at 60° C. in an oven for 60 minutes. A 10% strength by weight solution of PENTACOLL ET 691 A adhesive from WIKOLIN, in ethyl acetate, was then sprayed inside these sleeves, and, after slight drying of the inside of said sleeves, these elements treated with adhesive were applied to the outside of the straight section of preforms made of amorphous polyethylene terephthalate, weighing 55 g and having an initial thickness of polyester of 35 mm and an external diameter of 24.8 mm. These preforms were prepared by injection-molding using RHODESTER 85 TX from RHONE-POULENC. The entirety of the stretchable straight portion of the preform extending between the case of the neck and the bottom (100 mm) was coated in this manner. The amount of adhesive deposited, measured after removal of the solvent, was between 2 and 5 g per m² of casing applied in such manner.

The preforms coated in this fashion were stored for 24 hours at ambient temperature (20° C.) and then biaxially stretched (longitudinal stretching ratio: 2.5; transverse stretching ratio: 4) at 95° C., after having been preheated in a hot air oven.

On the biaxially oriented bottles formed in this manner, no defect in appearance was observed which could result from incipient fractures or from a lack of cohesion of the polyvinyl alcohol layer applied and biaxially stretched in this fashion.

In order to test the barrier properties of the composite thus produced, a disc was cut from the walls of the bottle and its permeability to oxygen was mesaured by gas phase chromatography, the thickness of the sample used being 320µ, including 20µ of polyvinyl alcohol. The measurements carried out under equilibrium conditions at 30° C. and at 60% relative humidity demonstrated that the permeability of the wall to oxygen was reduced in a ratio of 1 to 6, compared with that of a polyester control not coated with polyvinyl alcohol.

These excellent performance characteristics obtained at 60% relative humidity made it possible to again confirm the very good resistance to water of the coating according to the present invention.

While the invention has been described in terms of various preferred embodiments, the skilled artisan will appreciate that various modifications, substitutions, omissions, and changes may be made without departing from the spirit thereof. Accordingly it is intended that the scope of the present invention be limited solely by the scope of the following claims.

What is claimed is:

1. A process for preparing a film of polyvinyl alcohol which is gelled, non-tacky, bubble-free and resistant to water at ambient temperature, which comprises
   (a) introducing into an extruder flakes or granules of a mixture of polyvinyl alcohol and water having a water content ranging from 25 to 35% weight of said mixture, said flakes or granules of polyvinyl alcohol having an ester number less than 20;
   (b) fluxing and melting the flakes or granules at a temperature at least 100° C. above the equilibrium melting point of said mixture such as to avoid any phase heterogeneity in the molten mass; and
   (c) extruding the molten mass through a die at a temperature above the equilibrium melting point of the polyvinyl alcohol/water mixture, but below the temperature at which the vapor pressure of the water in the mixture would cause surface expansion and bubbling when the material is exposed to the air.

2. The process of claim 1 wherein the polyvinyl alcohol has an ester number of less than 10.

3. The process of claim 1 which further comprises monoaxially or biaxially stretching the extruded film of polyvinyl alcohol.

4. The process of claim 3 which further comprises heat treating the monoaxially or biaxially stretched polyvinyl alcohol film at a temperature of between 140° and 220° C., thereby further increasing crystallinity, water resistance and gas diffusion resistance of the heat treated film.

5. The process of claim 1 wherein the die is a flat die.

6. The process of claim 1 wherein the polyvinyl alcohol granules contain about 30% by weight of water.

7. The process of claim 1 where the fluxing of the polyvinyl alcohol/water granules is carried out at a temperature in the range of from about 100° C. above the equilibrium melting point of the granules to about 220° C., and wherein the extrusion temperature is in the range of from about 5° C. above the quilibrium melting point up to about 98° C.

8. The process according to claim 1 wherein the temperature at which the granules are plasticized and melted is between 150° and 200° C.

9. The process according to claim 6 wherein the temperature at which the polyvinyl alcohol granules are plasticized and melted is between 160° and 220° C.

10. The process according to claim 1 wherein the operation of extruding the molten material through the flat die is carried out at a temperature between the equilibrium melting point of the granules and a temperature below 110° C.

11. The process according to claim 10 wherein the extrusion temperature is between 5° above the equilibrium melting point and 98° C.

12. The process according to claim 1 wherein the extrusion temperature of the molten granules of polyvinyl alcohol is between 65° and 98° C.

13. The process according to claim 1 wherein the polyvinyl alcohol granules additionally contain a plasticizer in an amount such that the glass transition temperature of the polyvinyl alcohol does not decrease by more than 30° C.

* * * * *